United States Patent [19]

Mukai

[11] Patent Number: 5,019,975
[45] Date of Patent: May 28, 1991

[54] METHOD FOR CONSTRUCTING A DATA BASE IN A MEDICAL IMAGE CONTROL SYSTEM

[75] Inventor: Hachiro Mukai, Kanagawa, Japan

[73] Assignee: Fuji Photo Film Co., Ltd., Kanagawa, Japan

[21] Appl. No.: 342,828

[22] Filed: Apr. 25, 1989

Related U.S. Application Data

[63] Continuation-in-part of Ser. No. 275,623, Nov. 15, 1988, abandoned.

[30] Foreign Application Priority Data

Feb. 7, 1989 [JP] Japan .................................. 1-27842

[51] Int. Cl.⁵ .............................................. G06K 9/00
[52] U.S. Cl. ................................................ 364/413.13
[58] Field of Search ........................... 364/413.13, 300

[56] References Cited

U.S. PATENT DOCUMENTS 4,458,267  7/1984  Dolazza .
4,603,254  7/1986  Takano et al. .
4,672,683  6/1987  Matsueda .
4,817,050  3/1989  Komatsu et al. ..................... 364/900
4,876,643  10/1989  McNeill et al. ..................... 364/200

Primary Examiner—Jerry Smith
Assistant Examiner—Steven G. Kibby
Attorney, Agent, or Firm—Sughrue, Mion, Zinn, Macpeak & Seas

[57] ABSTRACT

A method for constructing a data base in a medical image filing system comprises the steps of recording information indicating the time at which each medical image is recorded and a rank of importance for each medical image as image retrieval signal data for image signals corresponding to each medical image; recording the number of times the image signals corresponding to each medical image have been retrieved as image retrieval signal data and incrementing said number each time the image signals are retrieved; and when the data base is full of image retrieval signal data, deleting the image retrieval signal data corresponding to the image signals of the medical image in which at least (i) the time at which said medical image was recorded earlier than a predetermined time and (ii) the rank of importance of the medical image is lower than a predetermined value.

9 Claims, 4 Drawing Sheets

FIG.3

| | IMAGE NO. | DATE OF IMAGE RECORDING | ------ | RANK |
|---|---|---|---|---|
| 1 | 1156 | 61. 4. 1 | | 0 |
| 2 | 1157 | 61. 4. 1 | | 2 |
| 3 | 2002 | 61. 7. 4 | | 1 |
| 4 | 2003 | 61. 7. 4 | | 3 |
| 5 | 2004 | 61. 7. 4 | | 3 |
| ⋮ | ⋮ | ⋮ | ⋮ | ⋮ |

PATIENT NAMES ○○×× SEX: M

METHOD FOR CONSTRUCTING A DATA BASE IN A MEDICAL IMAGE CONTROL SYSTEM

This application is a continuation-in-part application of Ser. No. 275,623 filed Nov. 15, 1988 now abandoned which was a continuation of application Ser. No. 081,766, filed Aug. 5, 1987, now abandoned.

BACKGROUND OF THE INVENTION

1. Field of the Invention

This invention relates to a method for constructing a data base in a medical image control system so that signals representing a medical image such as a radiation image may be retrievably filed.

2. Description of the Prior Art

Many medical images have heretofore been utilized when medical research is done in, for example, medical facilities such as hospitals. When medical treatments are given, medical images are also relied upon as sources of information. Most of the medical images are radiation images. In recent years, many computed tomography (CT) images, magnetic resonance (MR) images and the like are also utilized.

Medical images should be stored for investigating changes in the diseases of or injuries to patients, and it is legally stipulated that the medical images be stored for a predetermined period. Therefore, in hospitals or the like, the number of stored medical images increases from day to day. Medical images have heretofore been stored in the form of hard copies. However, storing the hard copies requires a large storage space, and burdensome operations for control and retrieval of the medical images in hospitals or the like must be conducted.

Accordingly, it has recently been proposed to employ an electronic filing method in which medical images are retrievably filed as image signals on a recording medium such as an optical disk. In cases where the medical images are filed in this manner on a recording medium, the space requirement and the burden of image storage are reduced, and image retrieval becomes easy and quick.

In general, three or four medical images such as radiation images are recorded per patient (object), and 50 to 100 medical images in total are recorded for a patient who is hospitalized for an extended period. In a medical image control system utilizing an electronic filing method as mentioned above, the names of patients are recorded as one of several items making up image retrieval signal data in an image retrieval data base. Therefore, even though many medical images per patient may be filed, all of the medical images related to a patient can be retrieved quickly when the name of the patient is specified.

However, in cases where many medical images per patient are filed, though the images can easily be retrieved, physicians or the like cannot readily discriminate between medical images important to a diagnosis and other medical images. Physicians or the like must select the images based on memory, which is unreliable, or must reproduce the medical images at random.

It is very uneconomical and time-consuming to reproduce a large number of medical images which are not required by a physician making a paricular diagnosis.

Also, since the amount of data which can be recorded in the image retrieval data base is limited, new data cannot be recorded in the data base if image retrieval signal data corresponding to the medical images which are not required by a physician making a particular diagnosis or those which will probably not be used in a diagnosis process are left in the data base for ever.

SUMMARY OF THE INVENTION

The primary object of the present invention is to provide a medical image control system which facilitates the selection and reproduction of medical images which are necessary to a diagnosis process.

Another object of the present invention is to provide a method for constructing a data base by which image retrieval data corresponding to medical images of relatively low utility can be deleted when the image retrieval data base is full.

The present invention provides a method for constructing a data base in a medical image control system in which image signals representing medical images are filed on a recording medium and said image signals are retrieved by use of said data base, said method comprising the steps of recording image retrieval signal data in said data base, said image retrieval signal data including information indicating the time at which each medical image is recorded, a rank of importance for each medical image, and a number indicating how many times the image signals corresponding to each medical image filed on said recording medium have been retrieved; incrementing said number each time a corresponding image signal is retrieved; and, when said data base is full of image retrieval signal data, deleting the image retrieval signal data corresponding to the image signals of the medical image in which at least (i) said time at which said medical image is recorded is earlier than a predetermined time and (ii) said rank of importance of said medical image is lower than a predetermined value.

With the medical image control system in accordance with the present invention wherein information on the importance of the medical image is recorded in the data base as image retrieval signal data, a number identifying a medical image fulfilling specified retrieval conditions and information about the importance of the medical image can be displayed on a cathode ray tube (CRT) or the like in the course of image retrieval. Therefore, a medical image that is necessary to a diagnosis process can be obtained, and the importance of the medical image can be confirmed on the basis of the displayed information. The medical image which is to be reproduced can then be designated. Also, when the data base is full, the image retrieval signal data corresponding to a medical image which is considered to be of relatively low utility, in view of the time which has passed since the recording thereof, the rank of importance thereof and the number of retrievals thereof, can be deleted, and thereby more image retrieval signal data corresponding to important medical images can be recorded in the data base.

BRIEF DESCRIPTION OF THE DRAWINGS

FIG. 3 is a schematic view showing an example of the display of the retrieval image list in the embodiment shown in FIG. 1.

DESCRIPTION OF THE PREFERRED EMBODIMENTS

The present invention will hereinbelow be described in further detail with reference to the accompanying drawings.

Figure 1:
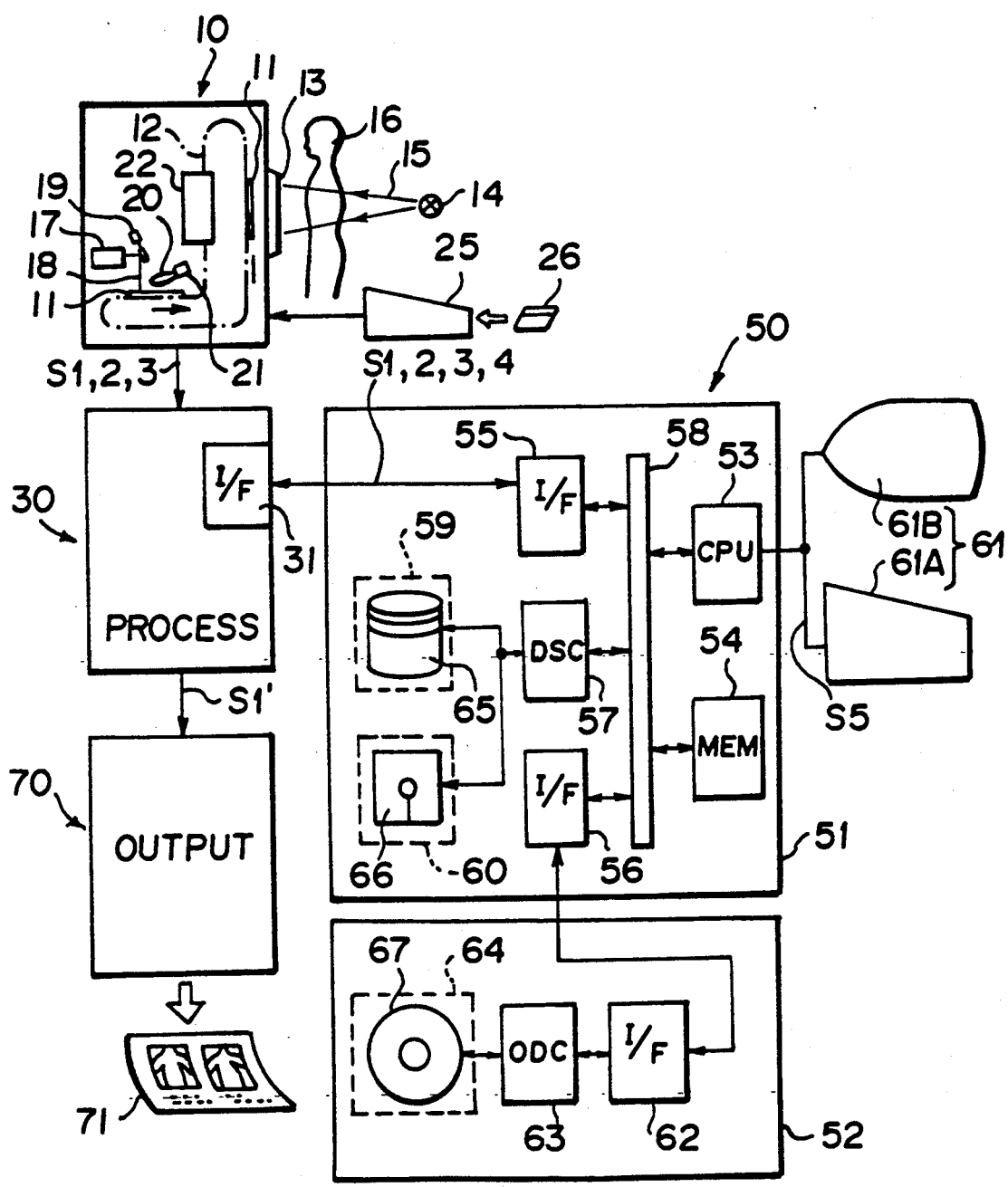
FIG. 1 is a schematic view showing an example of a medical image filing and reproducing system, which is an embodiment of the method for constructing a data base in accordance with the present invention.

Referring to FIG. 1, a medical image control system 50 is basically constituted of a system control device 51, an optical disk device 52, and an operating console 61 consisting of a keyboard 61A and a display device 61B which may be a cathode ray tube (CRT) or the like. The medical image control system 50 is connected to an image processing apparatus 30. The image processing apparatus 30 receives image signals S1 from a radiation image recording and read-out apparatus 10 which is an example of an image signal source, carries out a predetermined type of image processing on the image signals S1, and sends image signals S1' obtained from the image processing to an image output apparatus 70.

The radiation image recording and read-out apparatus 10 may be of the type disclosed in, for example, Japanese Unexamined Patent Publication No. 61(1986)-29834 or 61(1986)-94035, wherein stimulable phosphor sheets 11, 11 are conveyed and circulated along a circulation path 12, and a stimulable phosphor sheet 11 is stopped at a position facing an image recording stand 13 and is exposed to radiation 15 emitted by a radiation source 14 in order to store an image of an object (patient) 16 on the sheet 11. The stimulable phosphor sheet 11 carrying the radiation image stored thereon is conveyed to an image read-out section and two-dimensionally scanned with a laser beam 18 output by a laser beam source 17 and deflected by a light deflector 19. As the stimulable phosphor sheet 11 is exposed to the laser beam 18 acting as stimulating rays, the exposed portion of the sheet 11 emits light in proportion to the amount of energy stored thereon during exposure to radiation. The emitted light is photoelectrically detected by a photodetector 21 constituted of a photomultiplier or the like after it has been guided thereto by a light guide member 20. The analog output signal from the photodetector 21 is amplified, converted by an A/D converter, and exits the radiation image recording and read-out apparatus 10 as a digital image signal S1 representing the radiation image of the object 16. After the image read-out is finished in this manner, the stimulable phosphor sheet 11 is sent to an erasing section 22, where the sheet 11 is exposed to erasing light and any radiation energy remaining thereon is erased to such an extent that the sheet 11 is reusable for radiation image recording.

The radiation image recording and read-out apparatus 10 is connected to an ID terminal 25 at which information about a patient 16, which is written on an ID card 26 (hereinafter referred to as patient information), e.g. the name, sex, date of birth and similar information about the patient, is read out. Also, various conditions with regard to the recording of the radiation image (hereinafter referred to as image recording information), e.g. the information about the image number, the date the image was recorded, the portion of an object which was recorded, the size of the recorded image, the read-out sensitivity and the like are entered at the ID terminal 25. The patient information S2 and the image recording information S3 are fed to the image processing apparatus 30 together with the image signal S1.

The image processing apparatus 30 is constituted so that, for example, not less than 20 types of gradation processing and not less than 10 types of frequency response processing can be effected for the digital image signals S1. The image processing conditions are tabulated, and optimal image processing conditions are automatically selected from the table in accordance with the image recording information specified at the ID terminal 25. The image signals S1' obtained by carrying out image processing in the image processing apparatus in accordance with the optimal image processing conditions are sent to image output apparatus 70.

By way of example, the image output apparatus 70 is composed of a light beam scanning and recording apparatus for two-dimensionally scanning photographic film with a light beam modulated by an image signal S1', and an automatic developing machine for developing the exposed film. Through means of the light beam scanning and recording apparatus, the image which the image signal S1' represents, i.e. a radiation image of the patient 16, is recorded as a hard copy 71 on the photographic film.

The hard copy 71 of the radiation image formed by use of the photographic film as mentioned above is utilized in the diagnosis of an illness of a patient 16. Besides the aforesaid configuration, a CRT display device or the like may be used as the image output apparatus 70.

How the medical image control system 50 files the radiation image will be described hereinbelow. The system control device 51 of the medical image control system 50 is constituted of a known computer system and composed of a central processing unit (CPU) 53, a memory 54, interfaces 55 and 56, a disk drive controller 57, a bus 58 which connects these sections, a magnetic disk drive unit 59, and a floppy disk drive unit 60. The aforesaid keyboard 61A and the display device 61B are connected to the CPU 53, and the interface 55 is connected to an interface 31 in the image processing apparatus 30. On the other hand, the optical disk device 52 is composed of an interface 62 connected to the interface 56 in the system control device 51, an optical disk drive controller 63, and an optical disk drive unit 64.

The aforesaid patient information S2 and the image recording information S3 are transferred from the image processing apparatus 30 to the system control device 51, and sequentially recorded on a magnetic disk 65 operated by the magnetic disk drive unit 59, thereby to construct a data base. A floppy disk 66 operated by the floppy disk drive unit 60 is utilized for system control. The patient information S2, the image recording information S3 and the image signal S1 are transferred from the image processing apparatus 30 to the optical disk device 52, and filed on an optical disk 67 operated by the optical disk drive unit 64. At this time, the image signal S1 by-passes the image processing section in the image processing apparatus 30, and is recorded on the optical disk 67 as a raw signal which has not been subjected to image processing.

Figure 2:
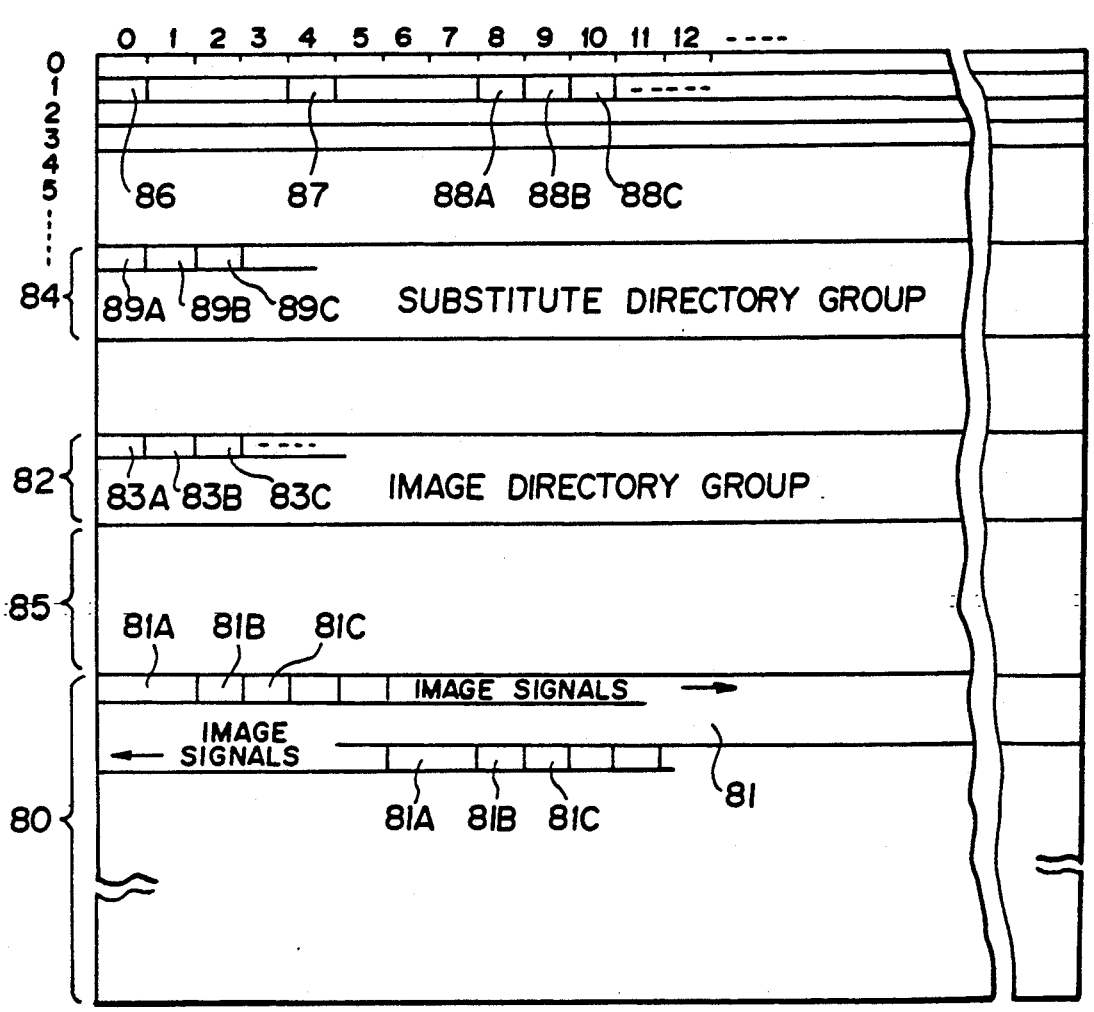
FIG. 2 is an explanatory view showing the recording format of an optical disk used in the embodiment shown in FIG. 1.

The recording of the image signal S1, the patient information S2, and the image recording information S3 on the optical disk 67 will now be described in detail with reference to FIG. 2 which shows the recording format of the optical disk 67. In FIG. 2, each graduation along the vertical axis indicates a single track on the optical disk 67, and each graduation along the horizontal axis indicates a single sector. The image signal S1 is recorded as a single image in an image signal recording region 80 which is sufficiently broadly formed on the optical disk 67. As is well known, signal recording is effected based on the formation of pits on the surface of the optical disk 67. A header 81A, where the patient information S2 and the image recording information S3 corresponding to the image signal S1 are to be recorded, and blocks 81B and 81C, where a signal S4 representing the image processing conditions for use in the image processing apparatus 30 is to be recorded are disposed before and after the image signal area 81 for the single image. These image processing conditions represented by the signal S4 are identical with the image processing conditions which were used when the image signal S1 was recorded in the image processing apparatus 30 in and sent immediately to the image output apparatus 70 for reproduction.

When the image signal S1 has been recorded in the image signal area 81 on the optical disk 67 in the manner described above, one of a plurality of image directories 83A, 83B, 83C, ... which corresponds to the image signal S1 stored in the image signal area 81 is recorded in an image directory region 82. Basically, in each of the image directories 83A, 83B, 83C, ..., the address of the header 81A corresponding to the image signal S1 recorded in the image signal area 81, the sector length of the image signal S1 in the image signal area 81, and characteristic information about the image signal S1 in the image signal area 81 are recorded.

Besides the image signal recording region 80 and the image directory region 82, the optical disk 67 is also provided with a region 84 on which substitution directories 89A, 89B, 89C, ... are formed. The substitution directories are used when a substitution for an image directory 83A, 83B, 83C, ... is made, i.e. when a directory is changed, and a region 85 on which directories of newly recorded signals representing information from a diagnosis card or the like are formed. Also, on the first track of the optical disk 67, there are formed a block 86 where the serial number of each optical disk 67 and a disk surface identification code are to be recorded, a block 87 for indication of the full status of the optical disk 67, and many directory entry blocks 88A, 88B, 88C, .... The first directory entry block 88A is used for indicating that a group of the image directories 83A, 83B, 83C, ... has been formed. The head address and the sector length of the image directory group (i.e. the group of directories formed in the image directory region 82) are recorded in the first directory entry block 88A. In the second directory entry block 88B, the head address and the sector length of the substitution directory group (89A, 89B, 89C, ...) are recorded. Also, in the third directory entry block 88C and subsequent directory entry blocks head addresses and sector lengths of future directory groups can be recorded.

In the manner described above, the image signal S1 is sequentially recorded as a single image on the optical disk 67, and the patient information S2, the image recording information S3, and the image processing condition signal S4 are sequentially recorded thereon in conformity with the image signal S1 representing each image. In order to increase the number of images capable of being filed on the optical disk 67, the image signal S1 should preferably be compressed by a known image signal compression technique before being recorded on the optical disk 67. Though an image signal S1, its corresponding patient information S2 and image recording information S3 contain a very large amount of data, approximately 1,000 images can be filed on a single optical disk 67 if an image signal compression technique is used. On the other hand, the recording capacity of a magnetic disk 65 is smaller than the recording capacity of the optical disk 67. However, only the patient information S2 and the image recording information S3 are recorded on the magnetic disk 65, and therefore the patient information S2 and the image recording information S3 for approximately 1,000,000 images can be filed thereon for example.

As a feature of the present invention, information on the importance of the radiation image can be entered into the system control device 51 by the operation of a keyboard 61A. Specifically, a physician or the like immediately observes the hard copy 71 output derived from the image signal S1' received from the image processing apparatus 30, and enters the rank of importance of the image to a diagnosis process (for example, the physician chooses one of six ranks ranging from rank 0 to rank 5) from a keyboard 61A. As the rank of importance is entered, the number of the image recorded on the hard copy 71 is also entered. The CPU 53 of the system control device 51 receives importance rank information S5 entered in this manner, and stores the importance rank information S5 on the magnetic disk 65 and the optical disk 67. At this time, the importance rank information S5 is recorded as an image retrieval signal with respect to the image number entered in the manner as mentioned above. That is, this data base is structured so that the importance rank information S5 is recorded on the magnetic disk 65 together with the aforesaid patient information S2 and the image recording information S3. Also, on the optical disk 67, the importance rank information S5 is recorded in the headers 81A, 81A before and after the image signal area 81 corresponding to the aforesaid image number as shown in FIG. 2. The importance rank information S5 need not necessarily be recorded on the optical disk and may be recorded only on the magnetic disk 65.

Also, besides being entered at the keyboard 61A, the importance rank information S5 may be entered from the ID terminal 25 or other terminal devices.

Image retrieval and reproduction will now be described below. As mentioned above, in the data base facilitating image retrieval the patient information S2 and the image recording information S3 are filed on the magnetic disk 65. An image retrieval operator correctly operates the keyboard 61A and enters the desired retrieval signal data by observing the display device 61B of the operating console 61. The system control device 51 retrieves a list of the images corresponding to the entered retrieval signal data from the data base on the magnetic disk 65, and displays the list on the display device 61B. Basically, as the retrieval signal data, all the items of the patient information S2 and the image recording information S3 can be used. For example, when the name of a patient, which is one of several items of the patient information S2, is designated as the retrieval signal data, an image list indicating the image numbers of all the images of the designated patient, the patient information S2 other than the name of the patient, the image recording information S3, and the importance rank information S5 is displayed on the display device 61B, for example, as shown in FIG. 3.

The retrieval operator selects a desired image from the displayed image list, and reserves the number of the image. The reserved image number is stored in the memory 54. In this manner, the image retrieval operation can be completed in advance even though the image processing apparatus 30 and the image output apparatus 70 might be in the process of reproducing an image by use of an image signal S1 just received from the radiation image recording and read-out apparatus 10. Also, even if the image which is to be retrieved is recorded on an optical disk different from the optical disk 67 loaded in the optical disk device 52 at the time the image retrieval operation is conducted, the retrieval operation carried out as mentioned above does not become invalid, and image reproduction can be started subsequently after the optical disk device 52 is loaded with the optical disk having the image corresponding to the reserved image number recorded thereon.

When information indicating that the image processing apparatus 30 is free reaches the system control device 51 after the aforesaid image retrieval operation is completed, the system control device 51 activates the optical disk device 52 so that it reads out the image signal corresponding to the reserved image number from the optical disk 67. In the course of the image signal read-out, an instruction commanding that the image directory group in the region 82 be read out is given, with the first directory entry block 88A acting as a pointer, and thus the image directories 83A, 83B, 83C, ... are read out. Also, one of the image directories 83A, 83B, 83C, ... in which the reserved image number is written acts as a pointer, and the header 81A indicated by said image directory is designated. In this manner, the information written in the header 81A, the image signals S1 written in the image signal area 81, and the information written in the blocks 81B and 81C corresponding to the header 81A are read out. At the same time, the number of times the read out image has been retrieved is recorded on the magnetic disk 65 as image retrieval signal data for that image This number is incremented each time image is read out. This number may be displayed in the list shown in FIG. 3.

The image signal S1 in the image signal area 81, the patient information S2 and the image recording information S3 in the header 81A, and the signal S4 representing the image processing conditions in the blocks 81B and 81C, which have been read out in the manner described above, are transferred from the system control device 51 to the image processing apparatus 30. In the image processing apparatus 30 the image signal S1 is subjected to image processing such as gradation processing or frequency response processing in accordance with the image processing conditions which the aforesaid signal S4 represents, and the processed image signal S1' is sent to the image output apparatus 70. In the image output apparatus 70, the processed image signal S1' is used, and the image is reproduced in the same manner described above. A hard copy 71 of the radiation image is formed. The patient information S2 and the image recording information S3 are utilized when the patient information and the image recording information are written on the hard copy 71.

As mentioned above, importance rank information 90 is indicated in the image list displayed on the display device 61B. Therefore, in cases where many images are retrieved for a single patient, the images of diagnostic importance can be selected by reference to the importance rank information 90 and can be reproduced.

When the list of retrieved images is displayed on the display device 61B, the image numbers can be displayed in the order of their rank of importance. Also, in the aforesaid embodiment, the importance rank information S5 is manually entered on the basis of the judgement of physicians or the like. However, the system may be constituted so that the CPU 53 or the like uses a predetermined program based the image recording method used, the image recording sequence or the like represented by the image recording information S3 to determine the rank of importance of the images automatically.

The CPU 53 transfers the image retrieval signal data to the magnetic disk 65 each time an image is recorded in the radiation image recording and read-out apparatus 10. However, since the memory capacity of the magnetic disk 65 is limited, the data base stored on the magnetic disk 65 will eventually be full.

In the method for constructing a data base in accordance with the present invention, when the data base is full as described above, the image retrieval signal data corresponding to a medical image which is considered to be of relatively low utility is deleted and new data is input into the data base. Namely, when the magnetic disk 65 is full of data, the disk drive controller 67 sends a signal to the CPU 53 which then displays warning information on the display device 61B. When a user such as a physician sees this information and, from the keyboard 61A, orders the CPU 53 to delete unnecessary image retrieval signal data from the magnetic disk 65, the CPU 53 selects the unnecessary image retrieval signal data and deletes it.

Figure 4:
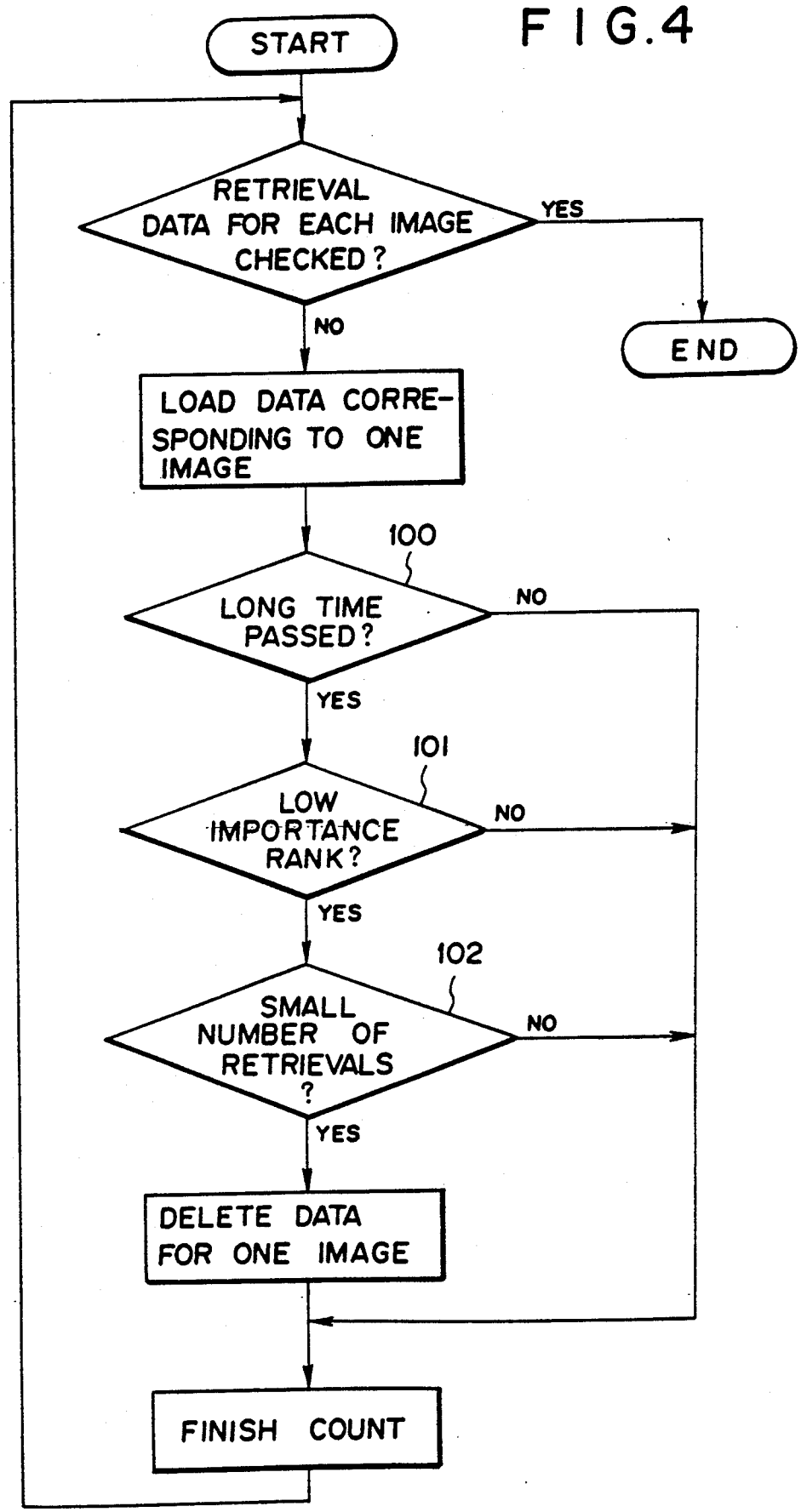
FIG. 4 is a flow chart showing a process for deleting image retrieval signal data.

For example, the unnecessary data is deleted according to the process shown in FIG. 4. Namely, when it is ordered to retrieve and delete unnecessary data, the image retrieval signal data is examined for each image. In step 100, whether the image recording date, which is a part of the image recording information S3, is earlier than a predetermined date or not, i.e. whether the time which has passed since the image was recorded is longer than a predetermined time or not, is determined. Then, in step 101, whether the rank of importance indicated by the importance rank information S5 is lower than a predetermined value or not is determined. In step 102, whether the above-mentioned number of retrievals is smaller than a predetermined number or not is determined. When at least one of the answers to these question is "NO", the data is regarded as necessary and maintained in the data base. On the other hand, when all the answers to these questions are "YES", i.e. when the time which has passed since the image was recorded is long, the importance rank is low and the number of retrievals is small, the data is regarded as having relatively low utility and is deleted from the data base. After all the image retrieval signal data in the data base has been evaluated and the unnecessary data has been deleted accordingly, the data base has space in which new image retrieval signal data can be recorded. The standards for judging whether the time which has passed since the image was recorded is too long, the rank of importance of the image is too low and the number of retrievals is too few, may be predetermined or may be determined interactively by a user who uses the keyboard 61A and refers to the display device 61B each time the display device 61B indicates that the data base is full.

Also, since the number of retrievals generally relates to the rank of importance, the image retrieval signal data may be evaluated and deleted on the basis of only the other two items, i.e. the time which has passed since the image was recorded and the rank of importance. Further, other items may be examined in addition to these three items.

Though the aforesaid embodiment applies to cases where radiation images are filed, the medical image control system in accordance with the present invention is also applicable to cases where other types of medical images such as CT images and MR images are to be filed.

I claim:

1. A method for constructing a data base in a medical image control system in which image signals representing medical images are filed on a recording medium and said image signals are retrieved by use of said data base, said method comprising the steps of recording image retrieval signal data in said data base, said image retrieval signal data including information indicating the time at which each medical image is recorded, a rank of importance for each medical image, and a number indicating how many times the image signals corresponding to each medical image filed on said recording medium base have been retrieved; incrementing said number each time a corresponding image signal is retrieved; and, when said data base is full of image retrieval signal data, deleting the image retrieval signal data corresponding to the image signals of the medical image in which at least (i) said time at which said medical image is recorded is earlier than a predetermined time and (ii) said rank of importance of said medical image is lower than a predetermined value.

2. A method as defined in claim 1 wherein said image signals are filed on an optical disk which serves as said recording medium, and said data base which facilitates the retrieval of said image signals is stored on a magnetic disk.

3. A method as defined in claim 1 wherein said image signals are compressed before being filed on said recording medium.

4. A method as defined in claim 1 further comprising a display device for displaying an image list indicating numbers of the medical images which numbers were retrieved on the basis of designated image retrieval signal data, and said importance rank information corresponding to said medical images which in turn correspond to said retrieval numbers.

5. A method as defined in claim 1 wherein said medical image is a radiation image, and said image signal representing said radiation image is a digital image signal obtained by photoelectrically detecting said radiation image stored on a stimulable phosphor sheet.

6. A method as defined in claim 1, wherein said rank of importance is determined in accordance with a type of image recording method.

7. A method as defined in claim 1, wherein said rank of importance is determined in accordance with an image recording sequence.

8. A method as defined in claim 1, wherein said rank of importance is determined in accordance with a physician's determination.

9. A method as defined in claim 1, wherein said rank of importance is determined in accordance with a predetermined program.

* * * * *

UNITED STATES PATENT AND TRADEMARK OFFICE
CERTIFICATE OF CORRECTION

PATENT NO. : 5,019,975

DATED : May 28, 1991

INVENTOR(S) : Hachiro Mukai

It is certified that error appears in the above-identified patent and that said Letters Patent is hereby corrected as shown below:

On the cover page at item [63], the Related U.S. Application Data, delete "Continuation-in-part of Ser. No. 275,623, Nov. 15, 1988, abandoned." and insert --Continuation-in-part of Ser. No. 275,623, Nov. 15, 1988, abandoned, which was a continuation of application Ser. No. 081,766, filed Aug. 5, 1987, now abandoned.--

UNITED STATES PATENT AND TRADEMARK OFFICE
CERTIFICATE OF CORRECTION

PATENT NO. : 5,019,975
DATED : May 28, 1991
INVENTOR(S) : Machiro Mukai

It is certified that error appears in the above-identified patent and that said Letters Patent is hereby corrected as shown below:

On the cover page at item [30], the Foreign Application Priority Data, delete "Feb 7, 1989 [JP] Japan ........ 1-27842"

and insert --Aug. 8, 1986 [JP] Japan ........ 61-186188

Feb 7, 1989 [JP] Japan ........ 1-27842--

Signed and Sealed this

Tenth Day of November, 1992

Attest:

DOUGLAS B. COMER

*Attesting Officer*     *Acting Commissioner of Patents and Trademarks*